United States Patent
Ramasubramanian et al.

(10) Patent No.: US 12,242,504 B2
(45) Date of Patent: Mar. 4, 2025

(54) MECHANISM FOR BACKFILLING RECORDS DROPPED DURING TRANSFER FROM DISTRIBUTED NODE SYSTEM

(71) Applicant: Microsoft Technology Licensing, LLC, Redmond, WA (US)

(72) Inventors: Srinath Gomathinathan Ramasubramanian, Redmond, WA (US); Prasanna Kumar Padmanabhan, Bellevue, WA (US); David Wang, Issaquah, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 46 days.

(21) Appl. No.: 18/161,551

(22) Filed: Jan. 30, 2023

(65) Prior Publication Data

US 2024/0256563 A1 Aug. 1, 2024

(51) Int. Cl.
*G06F 16/27* (2019.01)
*G06F 16/23* (2019.01)

(52) U.S. Cl.
CPC .......... *G06F 16/27* (2019.01); *G06F 16/2379* (2019.01)

(58) Field of Classification Search
None
See application file for complete search history.

(56) References Cited

U.S. PATENT DOCUMENTS

| | | |
|---|---|---|
| 7,197,638 B1 | 3/2007 | Grawrock et al. |
| 8,713,312 B2 | 4/2014 | Stefan et al. |
| 9,152,642 B2 | 10/2015 | Harrison et al. |
| 10,033,702 B2 | 7/2018 | Ford et al. |
| 10,506,038 B1 | 12/2019 | Patel et al. |

(Continued)

FOREIGN PATENT DOCUMENTS

| | | | |
|---|---|---|---|
| CN | 111143745 A | 5/2020 | |
| CN | 112561506 A | 3/2021 | |

(Continued)

OTHER PUBLICATIONS

Avvaru et al., Method and System for Synchronous Data Replication, 2021 (Year: 2021).*

(Continued)

*Primary Examiner* — Dawaune A Conyers
(74) *Attorney, Agent, or Firm* — Holzer Patel Drennan

(57) ABSTRACT

A method for backfilling records dropped by a distributed node system during a transfer to an external database includes initially determining whether an attempt to transfer a data record failed or succeeded. In response to determining that the transfer succeeded, the data record is appended at its original location include a first transfer status identifier. In response to determining that the transfer failed, the data record is appended to include a second transfer status identifier and queued copy of the data record is created by copying the data record to a delayed re-try queue. The method further includes verifying that the transfer status identifier of the queued copy is identical to the transfer status identifier of a newest version of the data record within the distributed node system and, responsive to the verification, attempting a subsequent transfer of the queued copy of the data record to the external database.

20 Claims, 7 Drawing Sheets

(56) References Cited

U.S. PATENT DOCUMENTS

| | | | |
|---|---|---|---|
| 10,691,653 B1* | 6/2020 | Aiken | G06F 16/258 |
| 10,880,366 B1 | 12/2020 | Chen et al. | |
| 11,102,313 B2 | 8/2021 | Straub | |
| 11,157,631 B1 | 10/2021 | Whelton | |
| 11,157,954 B1 | 10/2021 | Belanger et al. | |
| 2003/0101446 A1* | 5/2003 | McManus | G06F 8/60 |
| | | | 717/173 |
| 2005/0028046 A1 | 2/2005 | Mcardle | |
| 2015/0100545 A1* | 4/2015 | Ikegami | G06F 16/25 |
| | | | 707/609 |
| 2018/0060381 A1 | 3/2018 | Cook et al. | |
| 2018/0113862 A1* | 4/2018 | Glover | G06F 16/1873 |
| 2019/0043043 A1* | 2/2019 | Saraniecki | G06F 16/1774 |
| 2021/0218745 A1 | 7/2021 | Firnkorn et al. | |
| 2021/0382636 A1* | 12/2021 | Perumal | G06F 3/0622 |
| 2022/0369102 A1 | 11/2022 | Casati | |

FOREIGN PATENT DOCUMENTS

| | | |
|---|---|---|
| CN | 108156208 B | 2/2022 |
| CN | 114020207 A | 2/2022 |
| CN | 115391170 A | 11/2022 |

OTHER PUBLICATIONS

"Distributed Database Concepts", Retrieved From: https://docs.oracle.com/database/121/ADMIN/ds_concepts.htm#ADMIN028, Retrieved On: Dec. 28, 2022, 40 Pages.

"Understanding the Storage Path Failover Sequence in VMware ESXi Native Multipathing (1027963)", Retrieved From: https://kb.vmware.com/s/article/1027963, Mar. 31, 2021, 5 Pages.

Lev-Ari, "QuiCK: A Queuing System in CloudKit", In Proceedings of the International Conference on Management of Data, Jun. 20, 2021, pp. 2517-2529.

Tindel, et al., "Backfilling an Amazon DynamoDB Time to Live (TTL) attribute with Amazon EMR", Retrieved From: https://aws.amazon.com/blogs/database/backfilling-an-amazon-dynamodb-time-to-live-ttl-attribute-with-amazon-emr/, May 26, 2020, 11 Pages.

Zheng, et al., "Wharf: Sharing Docker Images in a Distributed File System", In Proceedings of the ACM Symposium on Cloud Computing, Oct. 11, 2018, 12 Pages.

* cited by examiner

MECHANISM FOR BACKFILLING RECORDS DROPPED DURING TRANSFER FROM DISTRIBUTED NODE SYSTEM

BACKGROUND

A distributed system contains multiple nodes that are physically separate but linked together using a network. Distributed systems can be tasked with a variety of different processes that the different nodes handle in tandem. The particular technology discussed herein relates to a distributed system that is tasked with storing a set of data records that are frequently regenerated based on new data, such as customer records that include time-sensitive data and that are pushed to a database in response to each re-generation. In this architecture, different consecutive updated versions of a same record may be stored on different nodes. The distributed node system implements logic to sequence the updates and ensure that it is aware of which node stores the most recent copy of each data record at each discrete location in time.

SUMMARY

According to one implementation, a distributed node system utilizes feedback from an external database to determine whether a data record was dropped during a transfer attempt. In response to determining that the transfer attempt succeeded, the node appends a local copy of the data record to include a first transfer status identifier. In response to determining that the transfer attempt failed, the node appends the data record to include a second transfer status identifier and copies the data record to a delayed re-try queue. The system further includes a backfill processor that re-attempts transfer of the queued copy of the data record in response to confirming that the transfer status identifier of the queued copy is identical to the transfer status identifier of a newest version of the data record within the distributed node system, thereby ensuring sequential updates to the external database without reading data out of the external database.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Other implementations are also described and recited herein.

DETAILED DESCRIPTION

Figure 1:
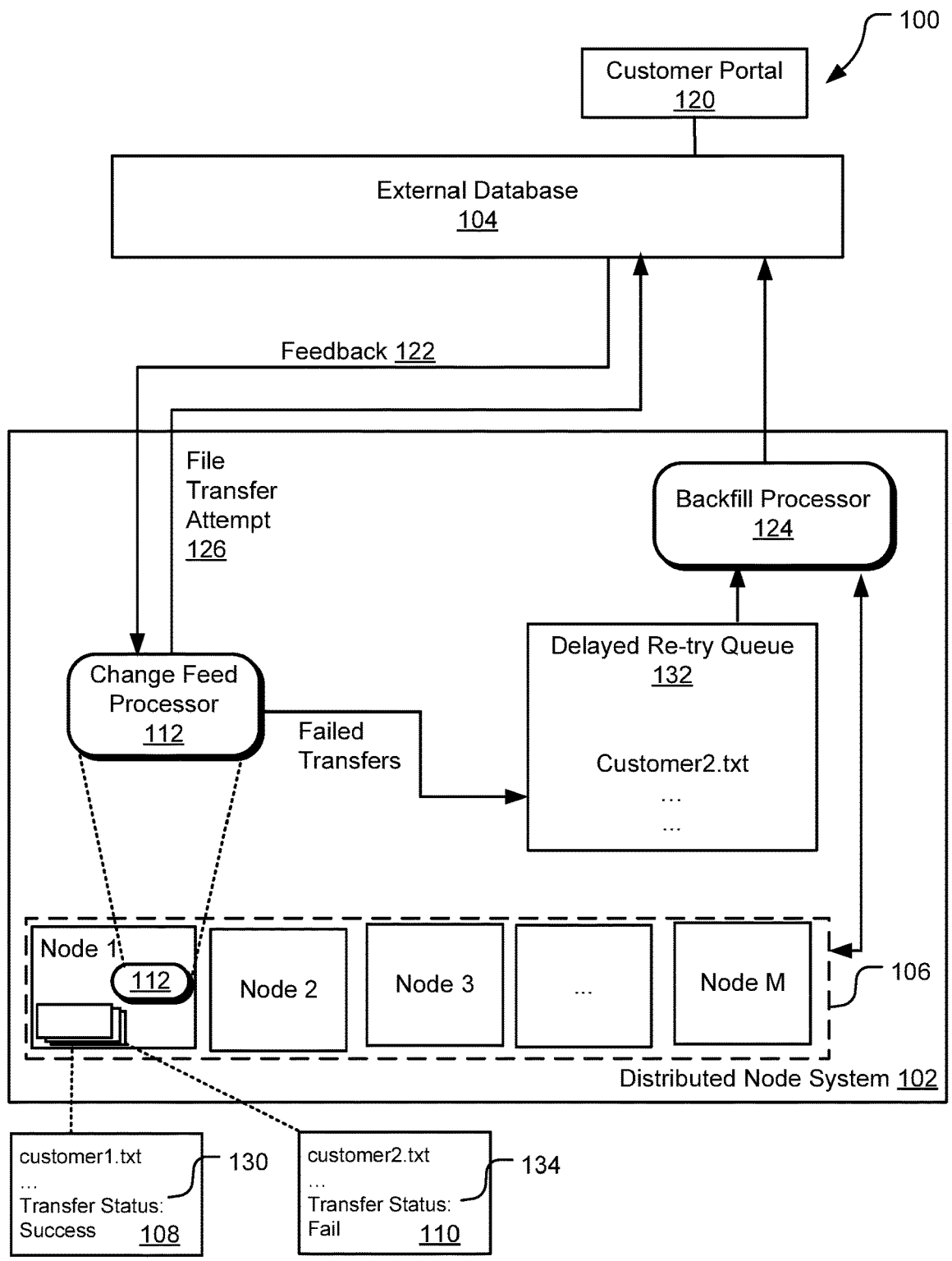
FIG. 1 illustrates an example system that includes a mechanism for backfilling data records that are, for various reasons, dropped during an initial file transfer to an external database.

In a distributed node system that is tasked with transferring various data records to an external database, there exist scenarios when certain file transfer attempts inevitably fail such as due to downed links, bugs, and other configuration issues. In a common scenario, a node attempting the data transfer may receive an error code from the external database and simply retry the transfer one or more times. However, certain types of network configuration issues take significant time (e.g., hours) to self-resolve, meaning that a re-transfer attempt may not succeed until significant time has passed. In these scenarios, a file transfer re-attempt may be scheduled for a later point in time, such as after an hour or more has elapsed. This subsequent re-try at the later time is referred to herein as a "delayed transfer re-try."

In a system that allows multiple different nodes to independently manage different updates to a same record, is becomes possible for a newer version of a data record to be created and transferred to an external database while an older version of the data record is in a queue awaiting a delayed transfer re-try. This scenario can result in out-of-sequence updates to the external database. To prevent out-of-sequence updates, a common practice is to compare contents of each file awaiting delayed transfer re-try to the like-named file residing in the external database. This practice is not possible when the distributed node system lacks read access to the external database.

One potential mechanism for preventing out-of-order updates in the above-described type of system is to provide a centralized logging mechanism with global awareness of each transfer attempt—e.g., a global logfile that includes an instance of each file transfer attempt, whether the transfer attempt succeeded or failed, and a way of uniquely identifying the particular version of the file affected (e.g., a timestamp or other information parsed from the file in scenarios where the file retains the same name across several updates). However, maintaining this type of globally accessible logfile (e.g., that tracks the outcome of each transfer attempt) can result in high processing latencies.

Further, even assuming that such a logging mechanism could be implemented effectively, further problems can arise in relation to delegating the delayed transfer re-tries to individual nodes in the above type of system. If, for example, an individual node obtains a particular version of a data record and is also tasked with handling delayed transfer re-tries for that version of the data record, this creates potential for a single point system failure. In the event that the node goes down for an indefinite period of time, the data record(s) awaiting delayed transfer re-try on the node are not accessible while the node is offline. This effectively creates a single-point system failure that can prevent the data records pending transfer on the node from reaching the external database in a timely manner.

The disclosed technology addresses the foregoing by providing a mechanism that facilitates backfilling an external database with records that, for various reasons, were dropped during initial file transfer attempts made by a distributed node system. The backfilling is achieved, in part, by way of node-implemented logging operations that make it possible for the system to easily determine which records have already been successfully transferred to the external database, even in scenarios where the distributed node system lacks read access to the external database. According to one implementation, the logging operations are implemented without maintaining a globally-accessible (centralized) logfile. Additionally, the disclosed backfill mechanism delegates delayed transfer re-tries to a processing entity that is separate from the system nodes, thereby eliminating the aforementioned potential for single point failure by ensuring that data records awaiting delayed transfer re-try are globally preserved when an individual node goes offline.

FIG. 1 illustrates an example system 100 that includes a mechanism for backfilling data records that are, for various reasons, "dropped"—meaning, not transferred successfully from a distributed node system 102 to an external database 104 during an initial attempt. The distributed node system 102 includes a set of nodes (e.g., Node 1, Node 2, . . . Node M) that function as a distributed database 106. The distributed database 106 stores a set of data records (e.g., data records 108, 110) that are repeatedly re-written (e.g., updated) based on data inputs that are subject to change in time. Each different version of the same record can potentially be stored on any of the nodes.

In relation to the technology disclosed, it is immaterial how the data records are obtained by the distributed node system 102. In one implementation, the data records are generated by processing logic implemented by the individual nodes of the distributed node system 102. In another implementation, the data records are generated by a mechanism external to the distributed database 106 or to the entire distributed node system 102. In this scenario, a data record is retrieved by or pushed to the distributed database 106 each time an updated becomes available.

Within the distributed database 106, multiple different nodes can be tasked with storing different versions of a same data record. For example, different versions of the data records 108 and 110 can be stored on different nodes. The distributed node system 102 implements logic to sequence the versions of the data records and thereby ensure that the system is able to determine which of the nodes (e.g., Node 1-Node M) is storing the most recent copy of each data record at each discrete point in time.

In one implementation, the filenames of the data records 108, 110 remain unchanged as the files are updated and/or regenerated multiple times Consequently, it is not possible to determine from the filenames of the data records 108, 110 when each data record was generated or whether a given record on one node is newer than a like-named record on another node. In one implementation, each different data record is associated with a customer account and includes customer account data. The customer data includes, for example, data pertaining to customer resource usage, metrics pertaining to health of a customer computing system, or any other customer data that is subject to change over time.

The distributed node system 102 implements logic to transmit each updated version of each data record from the distributed database 106 to an external database 104 which is, in one implementation, managed by a different administrative entity than the distributed node system 102 (e.g., a third-party database). For example, the external database 104 may be external to a firewall of the distributed node system 102 and/or require access credentials different from access credentials needed to read to or write from the distributed database 106. Although not necessary to implementation of the disclosed technology, it is contemplated that the distributed node system 102 may lack read access to the external database 104, meaning that the distributed node system 102 does not have the capability to retrieve already-transferred data records from the external database 104 and compare those records to records within the distributed node system 102.

In one implementation, the data records stored on the various nodes of the distributed node system 102 include customer data that is made accessible to the corresponding customers through a customer portal 120 associated with the external database 104. For example, each of the data records 108, 110 may be associated with a single customer and single customer account to the customer portal 120. When the customer logs into their account through the customer portal 120, the customer can view account information including data populated from correspond data records transferred to the external database 104 from the distributed node system 102. The account information for a given customer account may be periodically updated to include data from a newest version of the corresponding customer record (e.g., the data record 108 with filename "customer1.txt").

In the system 100, the system 100 includes a change feed processor 112 that identifies updated data (e.g., new files and/or file updates) within the distributed database 106. In FIG. 1, the change feed processor 112 is shown to be executing locally on Node 1, and it is assumed that a different instance of the change feed processor 112 executes on each other node in the distributed database 106. In another implementation, a single instance of the change feed processor 112 executes within the distributed node system 102 and the change feed processor 112 monitors data records on each of the nodes to identify data record updates.

When the change feed processor 112 identifies updated data within a data record on a particular node, such as a change to an existing data record or a newly-created data record, the change feed processor 112 executes operations to initiate transfer of the data record from the particular node to the external database 104. In the system 100 of FIG. 1, this is shown as "file transfer attempt 126," which is an operation executed by the change feed processor executing on the particular node storing the updated data. In other implementations (e.g., where the change feed processor 112 is external to the particular node storing the data record that is to be transferred), the node executes the file transfer attempt 126 in response to receiving a notification from the change feed processor 112.

In response to the file transfer attempt 126, the external database 104 provides feedback 122 to the distributed node system 102. The feedback 122 may be explicit or implicit. Explicit feedback includes, for example, an error code returned when an individual file transfer fails or, instead, a message confirming successful transfer in the event that the file transfer succeeds. Implicit feedback is, for example, a lack of feedback when a response is expected. For instance, the node executing the file transfer attempt 126 may determine that the file transfer attempt 126 as failed when an expected response is not received from the external database 104 within a predefined period of time.

When the file transfer attempt 126 has failed, the node attempting the transfer may execute retry logic, such as logic that instructs the node to retry a set number of times (e.g., 5 times) or until a set amount of time (e.g., 5 minutes) has elapsed. However, in some scenarios, such as when the transfer failure is caused by a network connectivity issue, it may not be possible to transfer the data records until after a longer period of time has elapsed, such as a few hours. The novel technology implemented by the system of FIG. 1 pertains to the management of these failed transfers that are queued for a later re-try attempt (a "delayed transfer re-try').

Assume, for example, that Node 1 obtains the data record 108, attempts to transfer the data record 108 to the external database 104, and receives an error. At this point, the record is considered a dropped record, and Node 1 may self-execute re-try logic that provides for one or more immediate additional transfer attempts.

To illustrate the challenges solved by the system 100, assume that Node 1 self-queues a "delayed transfer re-try" command that it is to execute at a set future time. While the delayed transfer re-try command is pending on Node 1, another system node obtains and successfully transfer a newer version of the data record to the external database 104. In this case, the delayed re-try on Node 1 could, if successful, overwrite a newer version of the data record in the external database 104 with an older version of the same data record. Further, if Node 1 were to go off-line intermittently while the delayed transfer re-try is pending, there exist scenarios where the queued delayed transfer re-try command could be lost entirely (e.g., such as if Node 1 experiences a reboot that inadvertently wipes the queued pending commands from volatile memory on Node 1).

To avoid the foregoing, the nodes in the distributed node system 102 perform local logging operations to record a transfer status identifier (e.g., 130) that indicates an outcome of the file transfer attempt 126 within the locally-stored version of the data record subject to the file transfer attempt 126. For instance, in response to the feedback 122 indicating that the data record 108 (e.g., customer1.txt) was successfully transferred to the external database, Node 1 appends its locally-stored copy of the data record 108 to include a transfer status identifier 130 that indicates the transfer was successful ("success"). Likewise, in response to the feedback 122 indicating that the data record 109 was dropped in an unsuccessful file transfer attempt, Node 1 appends its locally-stored copy of the data record 110 to include a transfer status identifier 134 that indicates the record was dropped ("fail"). By way of the transfer status identifier (e.g., 130 or 134) that is appended to each data record following the file transfer attempt 124 for the data record, the distributed node system 102 is able to easily determine whether a given version of the data record has or has not yet been subjected to a transfer attempt as well as whether or not the most recent transfer attempt has succeeded.

In one implementation, the change feed processor 112 is programmed to ignore updates pertaining to the transfer status identifier, thereby ensuring that the addition of a new transfer status identifier or change to an existing transfer status identifier within a given data record does not trigger a new transfer attempt.

In addition to adding the transfer status identifier to each data record following the associated file transfer attempt, the distributed node system 102 performs additional operations with respect to dropped data records. Whenever a system node updates the file status identifier 132 for a given data record (e.g., the data record 110) to include a failure status ("fail"), the data record copied to a delayed re-try queue 132, which is globally accessible (e.g., to all nodes) within the distributed node system 102. Assume, for example, that Node 1 receives an error from the external database 104 in response to a file transfer attempt of the data record 110. In this case, Node 1 may immediately execute one or more retries and—if still unsuccessful—update the data record 110 (e.g., the version stored on Node 1) to include the "fail" status for the transfer status identifier 130. Following this, Node 1 copies the data record 110 to the delayed re-try queue 132, where it is stored along with other dropped data records.

A backfill processor 134 is tasked with periodically, or in response to defined trigger events, executing a delayed transfer re-try of each data record pending in the delayed re-try queue 132. For example, the backfill processor 124 executes a delayed transfer re-try on each data record pending in the delayed re-try queue 132 at recurring set intervals, such as once per hour, once every four hours, twice daily, etc., removing the record from the queue once the transfer succeeds.

Prior to executing a delayed transfer attempt on each data record stored within the delayed re-try queue 132, the backfill processor 124 verifies the transfer status identifier associated with the data record in the distributed database 106 to ensure that, at the time of the delayed transfer re-try, the to-be transferred file is still more current than the most recent version of the file that was successfully transferred to the external database 104. For example, the backfill processor 124 selects a file from the delayed re-try queue 132 and queries the distributed database 106 with the name of the file to retrieve the file status identifier (e.g., 130 on 134) from a newest version of the data record residing in the distributed database.

As mentioned previously, the distributed database 106 implements logic to sequence data record updates such that it is self-capable of identifying which node in the database stores the most recent copy of each data record at any given time. Thus, given the name of a file residing in the delayed re-try queue 132 (e.g., "customer2.text"), the distributed database 106 is able to locate the newest version of the file in the distributed database 106. If the newest version of the file (e.g., customer2.txt) in the distributed database 106 has a "success" status for the transfer status identifier, that indicates that a newer version of the file has already been created and successful transferred to the external database 104. Therefore, in response to determining that the newest version of the file was successful transferred (and that there exists is a mismatch between the file status identifier within a queued copy of a data record and the file status identifier of the like-named newest version of the data record in the distributed database 106), the backfill processor 124 removes the data record from the delayed re-try queue 132 and takes no further action.

If, in the above scenario, the newest version of the file (e.g., "customer2.txt") in the distributed database 106 has a transfer status identifier identical to the corresponding file in the delayed re-try queue 132, this indicates that the version of the file residing in the delayed re-try queue 132 is still newer than the most recent version of the file that was added to the external database 104. In this case, the backfill processor 124 executes the delayed re-try transfer on the file. If the delayed re-try transfer succeeds, the file is removed from the delayed re-try queue 132. If the delayed re-try transfer fails, the file remains pending in the delayed re-try queue 132. The backfill processor 124 re-executes the above-described operations on remaining files in the delayed re-try queue 132 at the next pre-scheduled interval or in response to detection of a next defined trigger event.

In one implementation, the delayed re-try queue 132 is stored at a location that is separate from the nodes of the distributed node system 102, such as a separate server also hosting the backfill processor 124. The delayed re-try queue 132 is implemented with known, robust data safeguards, such as RAID (e.g., redundant array of independent disks) ensuring that files within the delayed re-try queue 132 can be restored in the event that the host server goes down. The use of the delayed re-try queue 124 as a centralized, globally-accessible storage location for dropped files ensures that individual system nodes are not tasked with carrying out delayed transfer re-try attempts. Consequently, files are not permanently dropped in scenarios where individual nodes temporarily become unavailable, such as due to hardware or software or network outages.

Further, the inclusion of the transfer status identifier (e.g., 130, 134) within each data record that is subjected to a transfer attempt provides the system 100 with a resource and bandwidth efficient way of tracking file transfer outcomes without the complexities of centralized logging in a distributed system. The transfer status identifier within each data record on the distributed database 106 provides the backfill processor 124 with a mechanism for determining which dropped files still need to be transferred and which are obsolete due to be being older than another version of the same file successfully transferred to the external database 104 while an older-version of the record was still pending in the delayed re-try queue 132. This mechanism prevents out-of-sequence updates to the external database 104 without requiring read access to the external database 104.

Figure 2A:
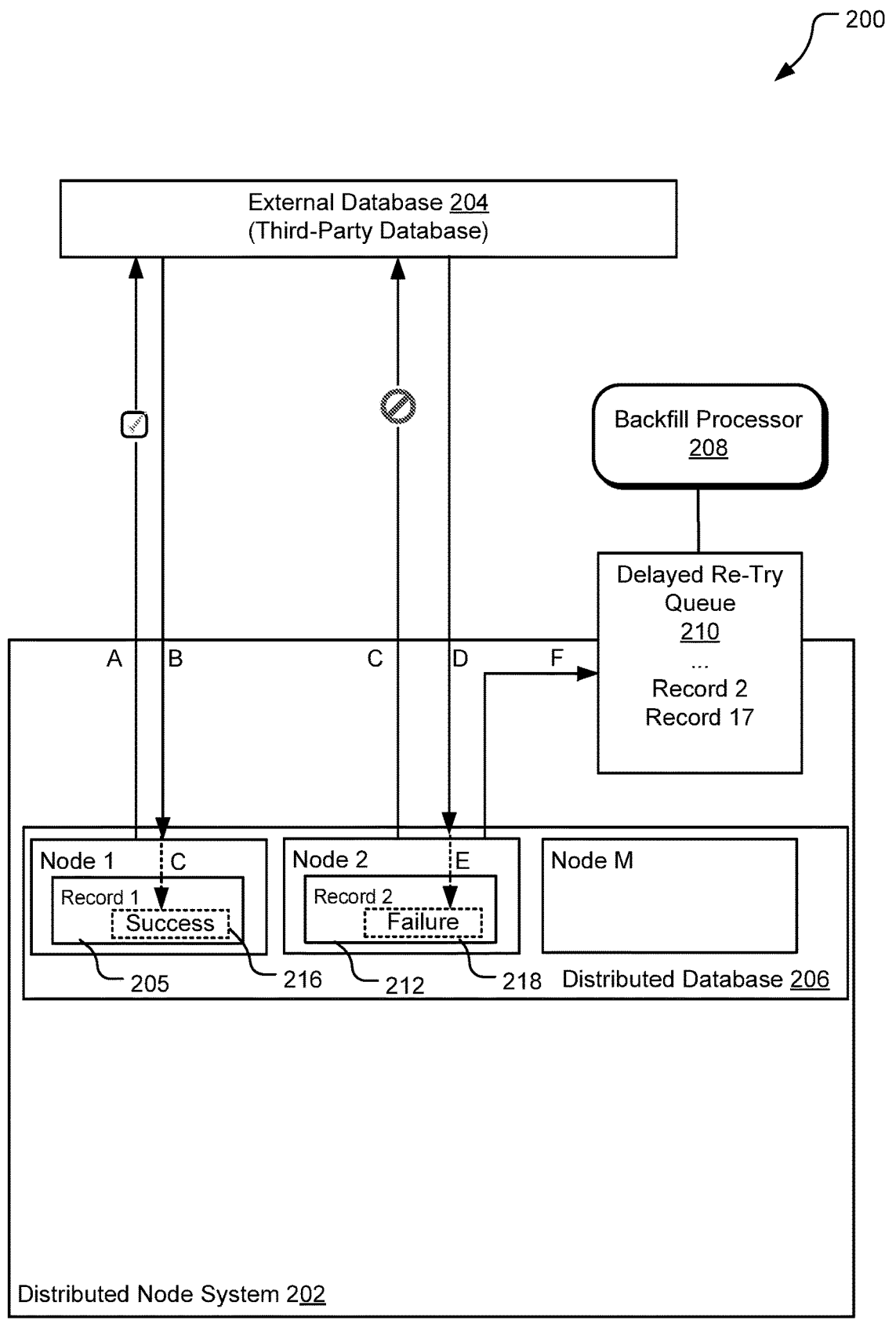
FIG. 2A illustrates a set of example operations performed by a distributed node system to backfill records dropped during an initial transfer attempt to an external database.
Figure 2B:
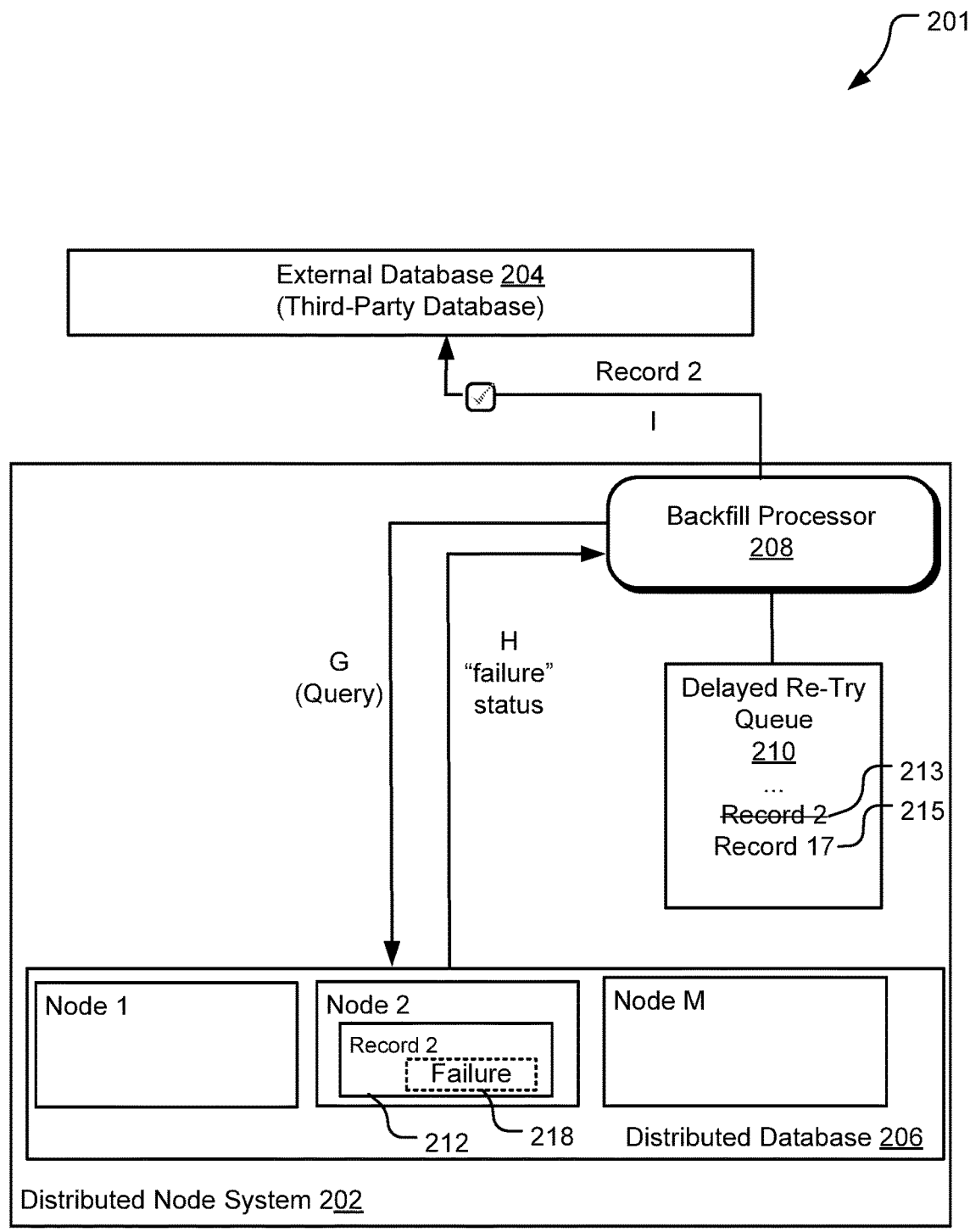
FIG. 2B illustrates example operations performed following the operations described with respect to FIG. 2A.
Figure 2C:
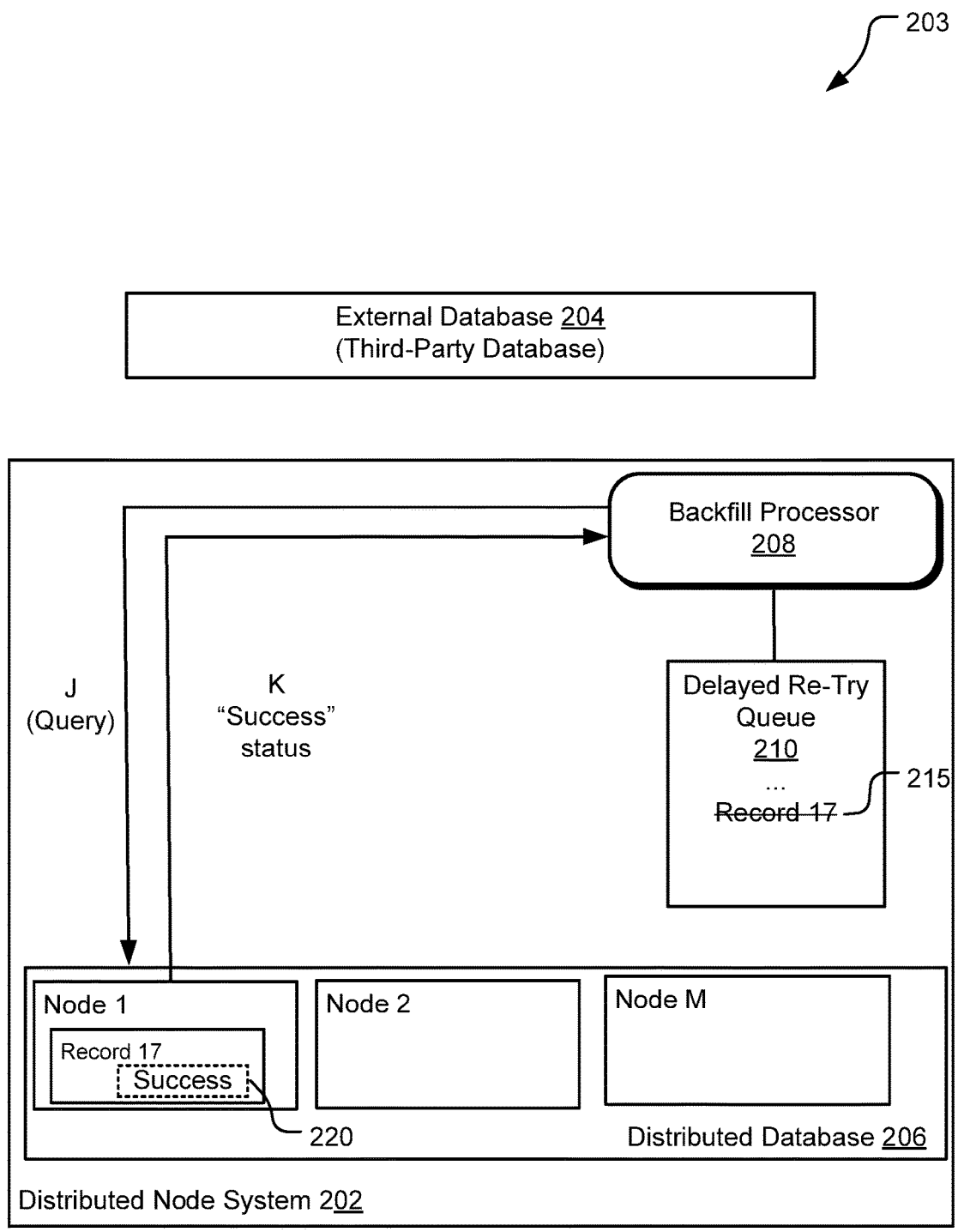
FIG. 2C illustrates further example operations performed following the operations described with respect to FIG. 2B.

FIG. 2A-2C illustrate example operations 200, 201, 203 performed by a distributed node system 202 to backfill records in an external database 204 that are dropped during an initial file transfer attempt. The distributed node system 202 executes logic to routinely update various data records that are stored within a distributed database 206. In one implementation, each update to a data record generates an updated file with a same filename as an older version of the file, and an updated version of a data file can be delegated to any system node for storage regardless of which node(s) stored previous version(s) of the same data file.

In one implementation, each node of the distributed database 206 individually executes logic to detect new data in the form of file updates and/or new files that are received for local storage. In response to detecting new data within a locally-stored file, the node attempts to transfer the file to the external database 204. Other aspects of the system shown in FIG. 2A-2C not specifically described herein are assumed to be the same or similar to those shown and described with respect to FIG. 1.

FIG. 2A illustrates a set of example operations 200 performed by the distributed node system 202 during a first time interval. In this scenario, Node 1 detects that a locally stored data file 205, entitled "Record 1," includes new data-meaning, the data file is either new to the distributed database 206 or else the data file 205 has been updated and includes data that is different from a most-recent previous version of the data file 205 stored elsewhere in the distributed database 206.

In response to determining that the data file 205 includes the new data, Node 1 attempts to transfer a copy of the data file 205 to the external database 204, as shown by arrow "A." When Node 1 attempts to transfer the data file 205, the external database 204 returns a success message, as represented by arrow B. In response to this, Node 1 locally updates the data file 205 to include a data transfer identifier 216 indicating that the file was successfully transferred, as shown by arrow "C."

Also shown in the example of FIG. 2A, Node 2 detects that a locally-stored data file 212, entitled "Record 2," includes new data and attempts to transfer a copy of the data file 212 to the external database, as shown by arrow C. In this case, the external database 204 returns an error code, as represented by arrow D. In response, Node 2 updates the data file 212 to include a data transfer identifier 218 ("failure"), as shown by arrow E. In response to adding the "failure" status identifier to the data file 212, Node 2 also copies the data file 212 ("Record 2") to a delayed re-try queue 210, as shown by arrow F.

FIG. 2B illustrates a set of example operations 201 performed by the distributed node system 202 following the operations described with respect to FIG. 2A. A backfill processor 208 executes logic that provides for periodically attempting to transfer files pending in the delayed re-try queue 210 to the external database 204. At the commencement of the operations 201, the delayed re-try queue 210 includes a queued copy 213 of a first data record, "Record 2," which was dropped in an initial transfer attempt made by Node 2 (as described with respect to FIG. 2A. The delayed re-try queue 210 also includes a queued copy 215 of another data record, "Record 17," which was dropped in an initial transfer attempt made by another system node.

Prior to attempting transfer of the queued copy 213 of "Record 2" to the external database 204, the backfill processor 208 queries the distributed database 206 to retrieve the file status identifier 218 of a newest version of a file with the same name as the queued copy 213 of "Record 2". In the illustrated scenario, this query is represented by arrow G and the distributed database 206 communicates a response, at arrow H, indicating that the corresponding requested record has a "fail" status for its transfer status identifier (meaning, the file was dropped in the last transfer attempt). The match between the file status identifier in the queued copy 213 of "Record 2" and the file status identifier 218 in the newest like-named file in the distributed database 206 indicates that the queued copy 213 is still more recent than a most-recent version of Record 2 that was successfully transferred to the external database 204. In this case, the backfill processor 208 executes a delayed transfer re-try, which succeeds at transferring the queued copy 213 of Record 2 to the external database 204, as indicated by arrow "I". The backfill processor 208 then removes the queued copy 213 from the delayed re-try queue 210.

FIG. 2C illustrates a set of example operations 203 performed by the distributed node system 202 following the operations described with respect to FIG. 2B. Prior to the operations 203, the delayed re-try queue 210 includes a queued copy 215 of a data record entitled "Record 17", which is a file that was dropped in an initial transfer attempt by one of the system nodes. Prior to attempting transfer of the queued copy 215 of Record 17 to the external database 204, the backfill processor 208 queries the distributed database 206, as indicated by arrow J, to retrieve the file status identifier 218 of a newest version of Record 17 from the distributed database 206. In this example, the newest version of Record 17 resides in Node 1 and has a file status identifier 220 that is indicative of successful transfer ("Success"). The distributed database 206 communicates a response, at arrow K, initiative of the "Success" file status identifier."

Here, the mismatch between the file status identifier 220 in the newest version of Record 17 and the file status identifier in the queued copy 215 of Record 17 indicates that a newer version of Record 17 was successfully transferred to the external database while the queued copy 215 was pending in the delayed re-try queue 210. Consequently, the backfill processor 208 deletes the queued copy 215 of Record 17 from the delayed re-try queue 210.

Figure 3:
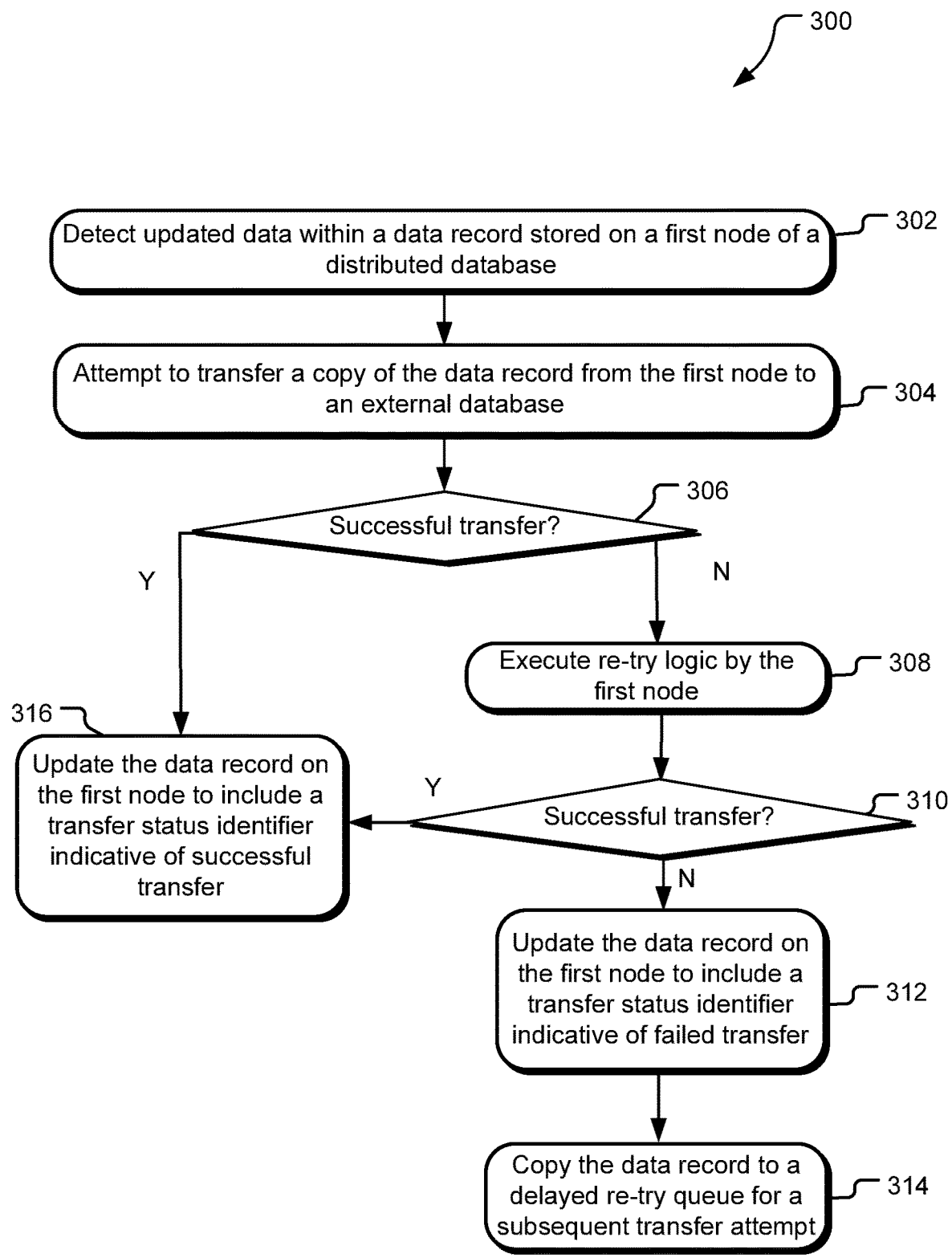
FIG. 3 illustrates example logging operations implemented as part of a mechanism that backfills dropped records in a distributed node system.

FIG. 3 illustrates example operations 300 implemented to backfill dropped records in a distributed node system. A detecting operation 302 detects new (updated) data within a data record stored on a first node of a distributed database.

For example, a file change watchdog executes locally on the first node and continuously monitors for changes to files that are stored on the first node. In response to identifying the data record with the new data, a file transfer operation 304 attempts to transfer a copy of the data record from the first node to an external database. A determining operation 306 determines whether the file transfer operation 304 was successful, such as based on feedback from the external database that confirms successful confirmation or instead returns an error code. If the transfer operation 304 was successful, an update operation 316 updates the data record on the first node to include a transfer status identifier indicative of the successful transfer.

If, on the other hand, the determining operation 310 determines that the transfer attempt was not successful, another update operation 312 updates the data record on the first node to include a transfer status identifier indicative of failed transfer. A copying operation 314 then copies the data record to a delayed re-try queue, which is globally accessible to the nodes of the distributed system. In one implementation, a backfill processor periodically re-tries to transfer each record pending in the delayed re-try queue to the external database. In one implementation, each of these delayed transfer re-try operations is performed conditionally in response to verifying that the transfer status identifier in the queued filed file (e.g., indicating a failed transfer) is identical to the transfer status identifier in a newest version of a like-named file residing within the distributed database. These verification and transfer re-try operations are described in greater detail with respect to FIG. 4.

Figure 4:
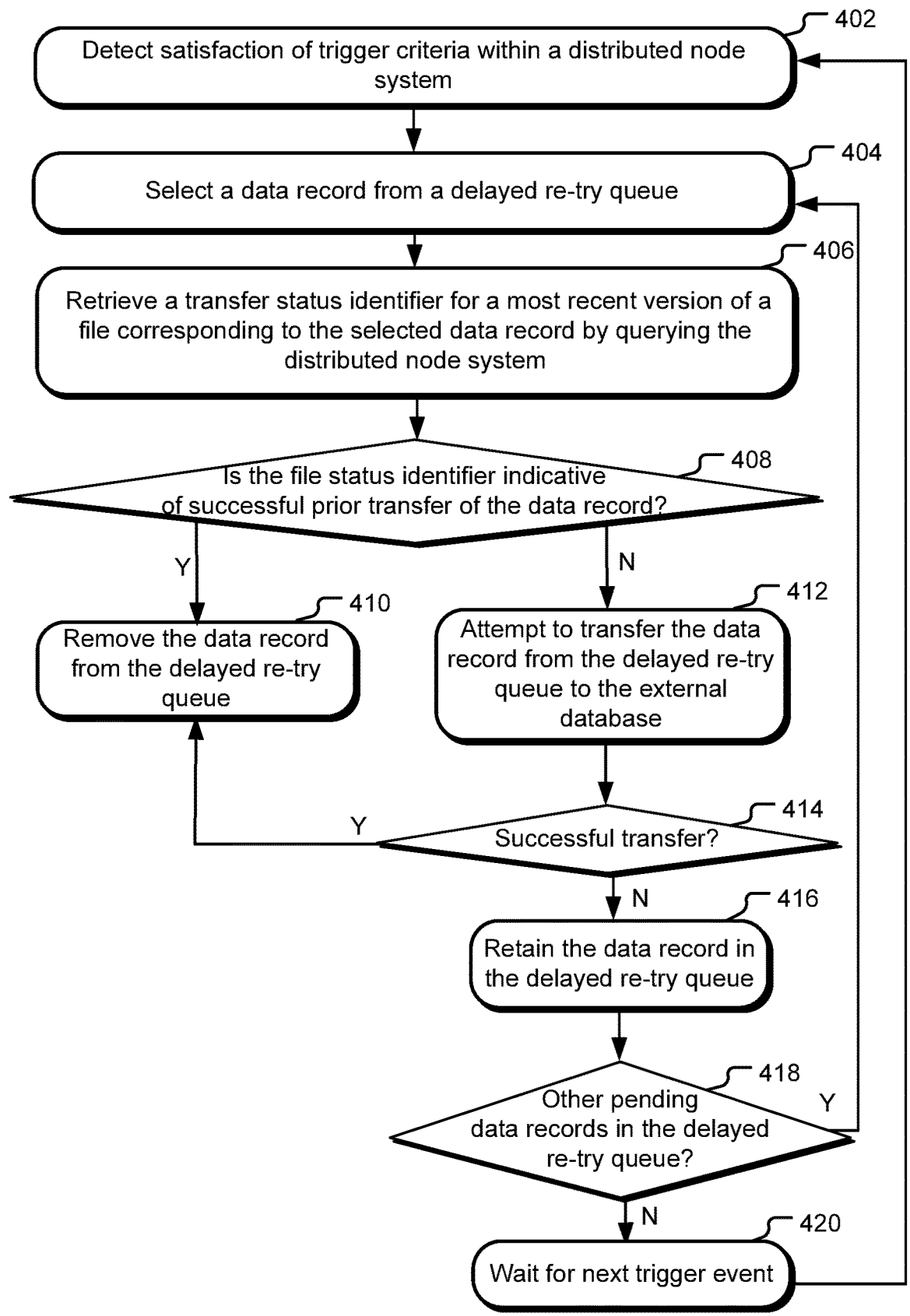
FIG. 4 illustrates example delayed transfer re-try operations performed on records added to a delayed re-try queue.

FIG. 4 illustrates example delayed transfer re-try operations 400 performed on data records added to a delayed re-try queue per the operations 300 of FIG. 3. In one implementation, the operations 300 of FIG. 3 are performed by an individual node of a distributed record system while the operations 400 are performed by a processor that is separate from the system nodes. The delayed re-try queue is a globally accessible by all storage nodes in the distributed database.

A detection operation 402 detects satisfaction of trigger criteria for initiating a batch of transfer re-tries on a collection of queued files. In one implementation, the trigger criteria is satisfied each time an elapsed timer reaches a predefined count, such as hourly, every four others, or other regular interval. In other implementations, the trigger criteria is satisfied when an external command is received or in response to detectable system conditions (e.g., traffic or CPU metric(s) satisfying predefined criteria). A selection operation 404 selects a queued copy of a data record residing in a delayed re-try queue. A query operation 406 queries a distributed database based on a filename of the selected queued item and, in response to the query, receives a transfer status identifier that is included within (e.g., previously appended to) a most recent version of a like-named data record in the distributed database.

A determining operation 408 determines whether a file status identifier returned in response to the query operation 406 is indicative of a successful prior transfer of the data record to the external database. If so, a file removal operation 410 removes the queued copy of the data record from the delayed re-try queue. If, on the other hand, the determining operation 408 determines that the file status identifier is indicative of a failed prior transfer attempt, a transfer operation 412 attempts to transfer the queued copy of the data record to the external database.

A determination operation 414 determines whether the transfer operation 412 succeeded in transferring the queued data record. If so, the data record is removed from the delayed re-try queue by the file removal operation 410. Otherwise, a retaining operation 416 retains the data record in the delayed re-try queue.

A determination operation 418 determines whether there remain other queued data records still pending the delayed re-try queue. If not, a waiting operation 420 is entered until the detection operation 402 again detects satisfaction of the trigger criteria. Conversely, if there are other pending data records pending in the delayed re-try queue, the selection operation 404 selects another queued data record and the operations 406-418 repeat.

Figure 5:
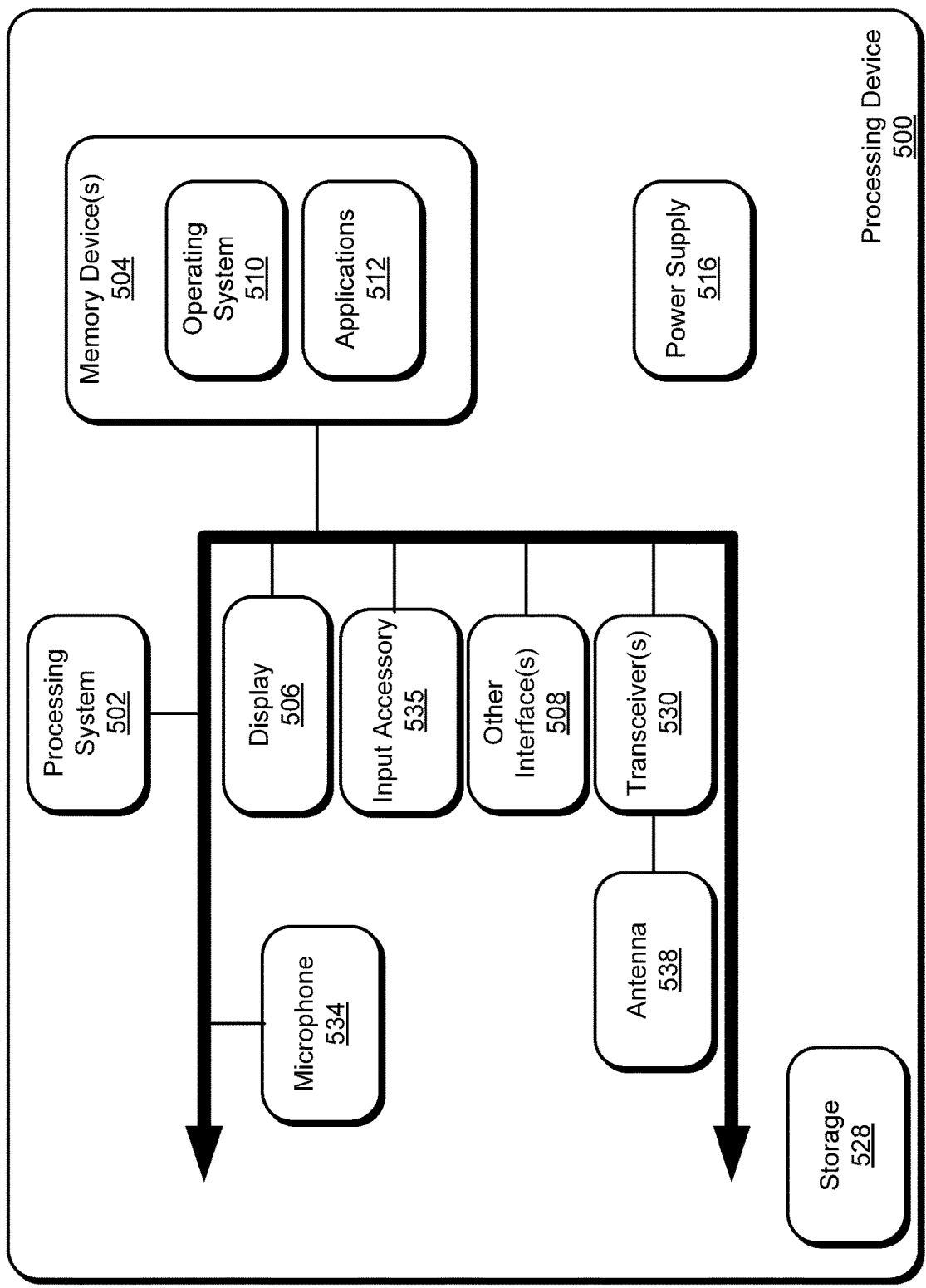
FIG. 5 illustrates an example schematic of a processing device suitable for implementing aspects of the disclosed technology.

FIG. 5 illustrates an example schematic of a processing device 500 suitable for implementing aspects of the disclosed technology. The processing devices 500 includes processing system 502 comprising one or more processor unit(s), memory device(s) 504, a display 506, and other interfaces 508 (e.g., buttons). The processor unit(s) may each include one or more computer processing units (CPUs), and graphics processing units (GPUs), etc.

The memory 504 generally includes both volatile memory (e.g., RAM) and non-volatile memory (e.g., flash memory). An operating system 510, such as the Microsoft Windows® operating system, the Microsoft Windows® Phone operating system, a MacOS® operating system, iOS® operating system, or a specific operating system designed for a gaming device, may reside in the memory 504 and be executed by the processing system 502, although it should be understood that other operating systems may be employed.

One or more applications 512 (e.g., logic implemented by the nodes or the backfill processor 124 of a distributed node system 102 of FIG. 1) are loaded in the memory 504 and executed on the operating system 510 by the processing system 502. The applications 512 may receive inputs from one another as well as from various input local devices such as a microphone 534, input accessory 535 (e.g., keypad, mouse, stylus, touchpad, gamepad, racing wheel, joystick), and a camera 532. Additionally, the applications 512 may receive input from one or more remote devices, such as remotely-located smart devices, by communicating with such devices over a wired or wireless network using more communication transceivers 530 and an antenna 538 to provide network connectivity (e.g., a mobile phone network, Wi-Fi®, Bluetooth®). The processing device 500 may also include one or more storage devices 528 (e.g., non-volatile storage). Other configurations may also be employed.

The processing device 500 further includes a power supply 516, which is powered by one or more batteries or other power sources and which provides power to other components of the processing device 500. The power supply 616 may also be connected to an external power source (not shown) that overrides or recharges the built-in batteries or other power sources.

The processing device 500 may include a variety of tangible computer-readable storage media and intangible computer-readable communication signals. Tangible computer-readable storage can be embodied by any available media that can be accessed by the processing device 500 and includes both volatile and nonvolatile storage media, removable and non-removable storage media. Tangible computer-readable storage media excludes intangible and transitory communications signals and includes volatile and nonvolatile, removable, and non-removable storage media implemented in any method or technology for storage of information such as computer readable instructions, data structures, program modules or other data. Tangible computer-readable storage media includes random access memory (RAM), read-only memory (ROM), electrically erasable programmable read-only memory (EEPROM), flash memory or other memory technology, CDROM, digital versatile disks (DVD) or other optical disk storage, magnetic cassettes, magnetic tape, magnetic disk storage or other magnetic storage devices, or any other tangible medium which can be used to store the desired information, and which can be accessed by the processing device 600. In contrast to tangible computer-readable storage media, intangible computer-readable communication signals may embody computer readable instructions, data structures, program modules or other data resident in a modulated data signal, such as a carrier wave or other signal transport mechanism. The term "modulated data signal" means a signal that has one or more of its characteristics set or changed in such a manner as to encode information in the signal. By way of example, intangible communication signals include wired media such as a wired network or direct-wired connection, and wireless media such as acoustic, radio frequency (RF), infrared and other wireless media.

Some implementations may comprise an article of manufacture. An article of manufacture may comprise a tangible storage medium (a memory device) to store logic. Examples of a storage medium may include one or more types of processor-readable storage media capable of storing electronic data, including volatile memory or non-volatile memory, removable or non-removable memory, erasable or non-erasable memory, writeable or re-writeable memory, and so forth. Examples of the logic may include various software elements, such as software components, programs, applications, computer programs, application programs, system programs, machine programs, operating system software, middleware, firmware, software modules, routines, subroutines, operation segments, methods, procedures, software interfaces, application program interfaces (API), instruction sets, computing code, computer code, code segments, computer code segments, words, values, symbols, or any combination thereof. In one implementation, for example, an article of manufacture may store executable computer program instructions that, when executed by a computer, cause the computer to perform methods and/or operations in accordance with the described implementations. The executable computer program instructions may include any suitable type of code, such as source code, compiled code, interpreted code, executable code, static code, dynamic code, and the like. The executable computer program instructions may be implemented according to a predefined computer language, manner or syntax, for instructing a computer to perform a certain operation segment. The instructions may be implemented using any suitable high-level, low-level, object-oriented, visual, compiled and/or interpreted programming language.

An example method of backfilling records dropped by a distributed node system during a transfer to an external database includes attempting to transfer a data record from a given node of the distributed node system to an external database and determining whether the transfer succeeded or failed. In response to determining that the transfer succeeded, the data record is appended on the given node to include a first transfer status identifier. In response to determining that the transfer failed appending the data record on the given node to include a second transfer status identifier and a queued copy of the data record is created by copying the data record to a delayed re-try queue. A subsequent transfer of the queued copy of the data record is attempted conditionally, in response to confirming that the transfer status identifier of the queued copy is identical to the transfer status identifier of a newest version of the data record within the distributed node system. This conditional transfer attempt ensures that the data record is not transferred in the event that a newer version of the data record has already been successfully transferred to the external database, thereby preventing out-of-order versioning updates to the external database.

In another example method of any preceding method, the queued copy of the data record is removed from the delayed re-try queue without being transferred the queued to the external database when it is confirmed that the transfer status identifier of the queued copy is not identical to the transfer status identifier of the newest version of the data record.

In still another example method of any preceding method, the distributed node system lacks read access to the external database.

In another example method of any preceding method, determining whether the transfer failed or succeeded is based on feedback from the external database and without reading data out of the external database.

In another example method of any preceding method, transfer of the data record to the external database is attempted one or more additional times in response to receiving the feedback and prior to creating the queued copy of the data record.

In still another example method of any preceding method, the distributed node system includes a plurality of nodes tasked with storing a plurality of data records. Different versions of each record of the plurality of records are stored on different nodes of the plurality.

In still another example method of any preceding method, the distributed node system implements logic to track and identify a newest copy of each of the data records at each point in time.

In still yet another example method of any preceding method, different versions of a same record have identical filenames.

In still other implementation, some implementations include a computing system that implements a mechanism to backfill records dropped during attempted transfer from a distributed node system to an external database. Each node in the system is configured to attempt a transfer of a data record residing on the node to an external database and, in response to determining that the transfer succeeded, append the data record on the node to include a first transfer status identifier indicative of successful transfer. Conversely, in response to determining that the transfer failed, the node is configured to append the data record on the node to include a second transfer status identifier indicative of failed transfer and create a queued copy of the data record by copying the data record to a delayed re-try queue. The system further includes a backfill processor configured to attempt a subsequent transfer of the queued copy of the data record to the external database. The backfill processor attempts the subsequent transfer conditionally, in response to confirming that the transfer status identifier of the queued copy is identical to the transfer status identifier of a newest version of the data record within the distributed node system. The computing system includes hardware logic circuitry that is configured to perform any of the methods described herein.

In yet another aspect, some implementations include a computer-readable storage medium for storing computer-readable instructions. The computer-readable instructions, when executed by one or more hardware processors, perform any of the methods described herein.

In yet another aspect, a distributed node system includes a means for determining whether an attempt to transfer a data record from a given node to an external database succeeded or failed. The system further includes a means for appending the data record, on the given node, to include a first transfer status identifier in response to determining that the transfer succeeded. The system further includes a means for appending the data record, on the given node, to include a second transfer status identifier in response to determining that the transfer failed and a means for copying the data record to a delayed re-try queue in response to determining that the transfer failed. The system further includes a means for attempting a subsequent transfer of the data record from the delayed re-try queue to the external database conditionally, in response to confirming that the transfer status identifier of the data record in the delayed re-try queue is identical to the transfer status identifier of a newest version of the data record within the distributed node system.

The logical operations described herein are implemented as logical steps in one or more computer systems. The logical operations may be implemented (1) as a sequence of processor-implemented steps executing in one or more computer systems and (2) as interconnected machine or circuit modules within one or more computer systems. The implementation is a matter of choice, dependent on the performance requirements of the computer system being utilized. Accordingly, the logical operations making up the implementations described herein are referred to variously as operations, steps, objects, or modules. Furthermore, it should be understood that logical operations may be performed in any order, unless explicitly claimed otherwise or a specific order is inherently necessitated by the claim language. The above specification, examples, and data, together with the attached appendices, provide a complete description of the structure and use of exemplary implementations.

What is claimed is:

1. A distributed node system comprising:
    a node configured to:
        attempt a transfer of a data record residing on the node to an external database;
        in response to determining that the transfer succeeded, append the data record on the node to include a first transfer status identifier indicative of successful transfer;
        in response to determining that the transfer failed, append the data record on the node to include a second transfer status identifier indicative of failed transfer and create a queued copy of the data record by copying the data record to a delayed re-try queue; and
    a backfill processor configured to attempt a subsequent transfer of the queued copy of the data record to the external database in response to confirming that the transfer status identifier of the queued copy is identical to the transfer status identifier of a newest version of the data record within the distributed node system.

2. The distributed node system of claim 1, wherein the backfill removes the queued copy of the data record from the delayed re-try queue without transferring the queued copy to the external database in response to confirming that the transfer status identifier of the queued copy is not identical to the transfer status identifier of the newest version of the data record.

3. The distributed node system of claim 1, wherein the distributed node system lacks read access to the external database.

4. The distributed node system of claim 1, wherein the node determines whether the transfer attempt succeeded or failed based on feedback received from the external database and without reading data out of the external database.

5. The distributed node system of claim 4, wherein the node attempts to re-transfer the data record one or more additional times in response to the feedback and prior to adding the data record to the delayed re-try queue.

6. The distributed node system of claim 1, wherein the distributed node system includes a plurality of nodes tasked with storing a plurality of data records, wherein different versions of each record of the plurality of records are stored on different nodes of the plurality.

7. The distributed node system of claim 1, wherein the distributed node system implements logic to track and identify a newest copy of each of the data records at each point in time.

8. The distributed node system of claim 1, wherein the node attempts to transfer the data record in response to receiving a notification that the data record has been updated.

9. The distributed node system of claim 1, wherein different versions of a same record have identical filenames within the distributed node system.

10. A method of backfilling records dropped by a distributed node system during a transfer to an external database, the method comprising:
    attempting to transfer a data record from a given node of the distributed node system to an external database;
    determining whether the transfer succeeded or failed;
    in response to determining that the transfer succeeded, appending the data record on the given node to include a first transfer status identifier;
    in response to determining that the transfer failed appending the data record on the given node to include a second transfer status identifier and creating a queued copy of the data record by copying the data record to a delayed re-try queue; and
    in response to confirming that the transfer status identifier of the queued copy is identical to the transfer status identifier of a newest version of the data record within the distributed node system, attempting a subsequent transfer of the queued copy of the data record to the external database.

11. The method of claim 10, further comprising:
    in response to confirming that the transfer status identifier of the queued copy is not identical to the transfer status identifier of the newest version of the data record, removing the queued copy of the data record from the delayed re-try queue without transferring the queued copy to the external database.

12. The method of claim 10, wherein the distributed node system lacks read access to the external database.

13. The method of claim 10, wherein determining whether the transfer failed or succeeded is based on feedback from the external database and without reading data out of the external database.

14. The method of claim 13, further comprising: attempting transfer of the data record to the external database one or more additional times in response to receiving the feedback and prior to creating the queued copy of the data record.

15. The method of claim 10, wherein the distributed node system includes a plurality of nodes tasked with storing a plurality of data records, wherein different versions of each record of the plurality of records are stored on different nodes of the plurality.

16. The method of claim 10, wherein the distributed node system implements logic to track and identify a newest copy of each of the data records at each point in time.

17. The method of claim 10, wherein different versions of a same record have identical filenames.

18. One or more tangible computer-readable storage media encoding computer-executable instructions for executing a compute process comprising:

attempting to transfer a data record from a given node of the distributed node system to an external database;

determining whether the transfer succeeded or failed;

in response to determining that the transfer succeeded, appending the data record on the given node to include a first transfer status identifier;

in response to determining that the transfer failed appending the data record on the given node to include a second transfer status identifier and creating a queued copy of the data record by copying the data record to a delayed re-try queue; and in response to confirming that the transfer status identifier of the queued copy is identical to the transfer status identifier of a newest version of the data record within the distributed node system, attempting a subsequent transfer of the queued copy of the data record to the external database.

19. The one or more tangible computer-readable storage media of claim 18, wherein the computer process further comprises:

in response to confirming that the transfer status identifier of the queued copy is not identical to the transfer status identifier of the newest version of the data record, removing the queued copy of the data record from the delayed re-try queue without transferring the queued copy to the external database.

20. The one or more tangible computer-readable storage media of claim 18, wherein determining whether the transfer failed or succeeded is based on feedback from the external database and without reading data out of the external database.

* * * * *